INVENTOR.
ALBERT G. BODINE
BY Edward A. Sokolski
ATTORNEY

INVENTOR.
ALBERT G. BODINE
BY Edward A. Sokolski
ATTORNEY

United States Patent Office 3,406,782
Patented Oct. 22, 1968

3,406,782
ACOUSTICAL IMPEDANCE TRANSFORMER FOR COUPLING SONIC ENERGY TO THE EARTH
Albert G. Bodine, 7877 Woodley Ave.,
Van Nuys, Calif. 91406
Filed Nov. 7, 1966, Ser. No. 592,529
8 Claims. (Cl. 181—.5)

ABSTRACT OF THE DISCLOSURE

Sonic energy is coupled from a sonic generator comprising a relatively low mass through a compliant member which provides an acoustical impedance transformation to a high mass base member which is coupled directly to the ground. The compliant member, which may comprise a pneumatically loaded diaphragm device or an elastic resonant bar member acting as an acoustical lever, effectively impedance matches the relatively low impedance output of the sonic generator to the relatively high impedance of the high mass device, which in turn provides a good impedance match to the ground which receives the sonic energy therefrom.

Figure 1:
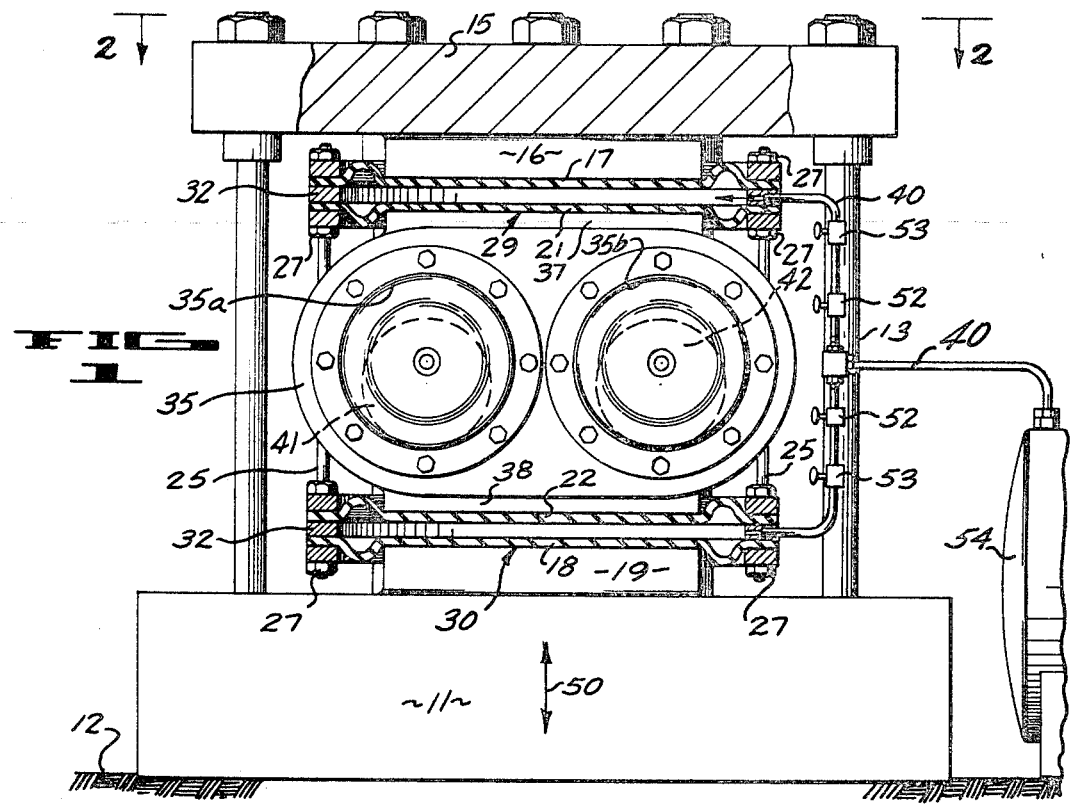

This invention relates to an acoustical impedance transformer for coupling sonic energy to the earth and more particularly to such a device suitable for utilization in seismic survey appartus.

In my Patent No. 2,745,507, apparatus is described for coupling high level sonic energy into the ground for analyzing the geological strata. The apparatus described in this patent makes use of orbiting mass oscillators for generating the acoustical energy, the output of such orbiting mass oscillators being coupled to the surface of the earth through a high mass base member. To make an effective survey of the strata, it is desirable to sweep the oscillator frequency over a band of frequencies which is generally between about 20 and 60 cycles per second. It has been found while fairly good coupling of the sonic energy to the earth can be achieved at the lower end of this frequency band in view of the good low frequency response characteristics of most earthen material, that as the sonic frequency is increased, the impedance match and hence the coupling of the sonic energy to the earthen material deteriorates rapidly so that at the higher frequencies swept, a serious impedance mismatch occurs which results in high energy losses and often manifests itself by a "hopping" condition of the high mass device used for coupling the energy to the ground.

The appartus of this invention provides means for overcoming the aforementioned shortcomings of prior art devices in the form of an acoustical impedance transformation device which effectively provides a good impedance match between the sonic energy source and the ground over the entire frequency range swept. In one embodiment of the device of the invention, this impedance transformation is achieved by means of a pneumatically loaded diaphragm device interposed between the sonic energy source and a high mass base member coupled to the ground. The diaphragm member provides an effective pneumatic "spring." The compliance of this pneumatic "spring" is changed by varying the pneumatic loading on the diaphragm device to provide an optimum effective matching impedance at all of the frequencies in the frequency sweep range. In this manner optimum energy transfer is attained at all of the transmission frequencies.

In another embodiment of the invention, impedance matching is achieved by means of an elastic resonant bar member interposed between the sonic energy source and the earth-connected high mass base member. The resonant bar member acts as an acoustical lever which is designed to efficiently couple the low impedance oscillator output to the high impedance base member. In effectively achieving the desired impedance transformation in both embodiments, it is to be noted that the effective resonant frequency of the vibration system, including the transformation element and the base member, is made higher than the natural vibration frequency of either the base member in itself or that of the ground.

It is therefore an object of this invention to provide means for more efficiently coupling sonic energy to the ground for transmission therethrough.

It is another object of this invention to enable the efficient coupling of sonic energy into the ground over a band of frequencies.

It is still another object of this invention to provide a pneumatic acoustic impedance transformer which can be adjusted for optimum coupling of sonic energy from a sonic generator to the ground.

It is still a further object of this invention to provide apparatus for efficiently coupling high level sonic energy into the ground which is suited to portable use.

Figure 2:
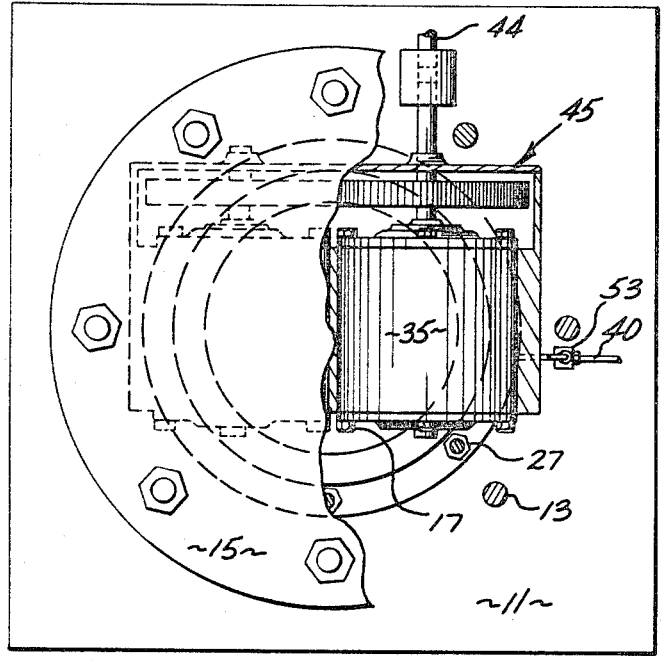
Figure 3:
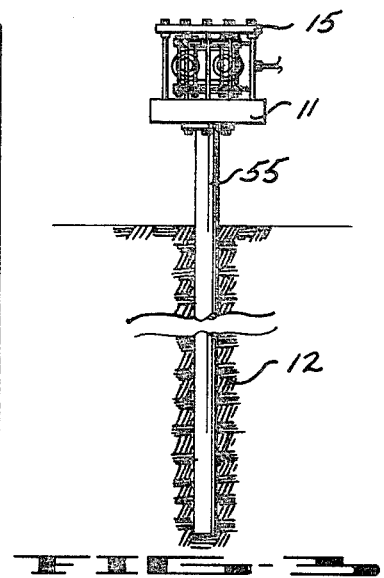
Figure 4:
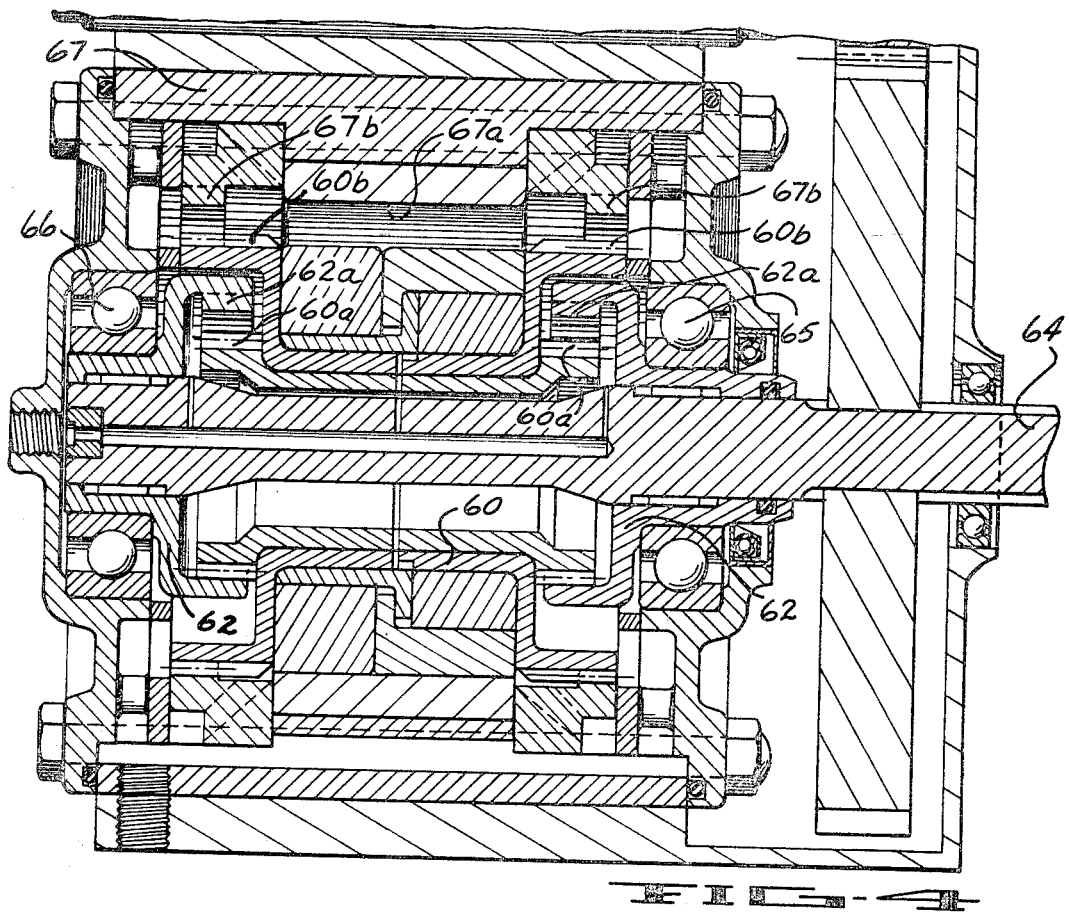
Figure 5:
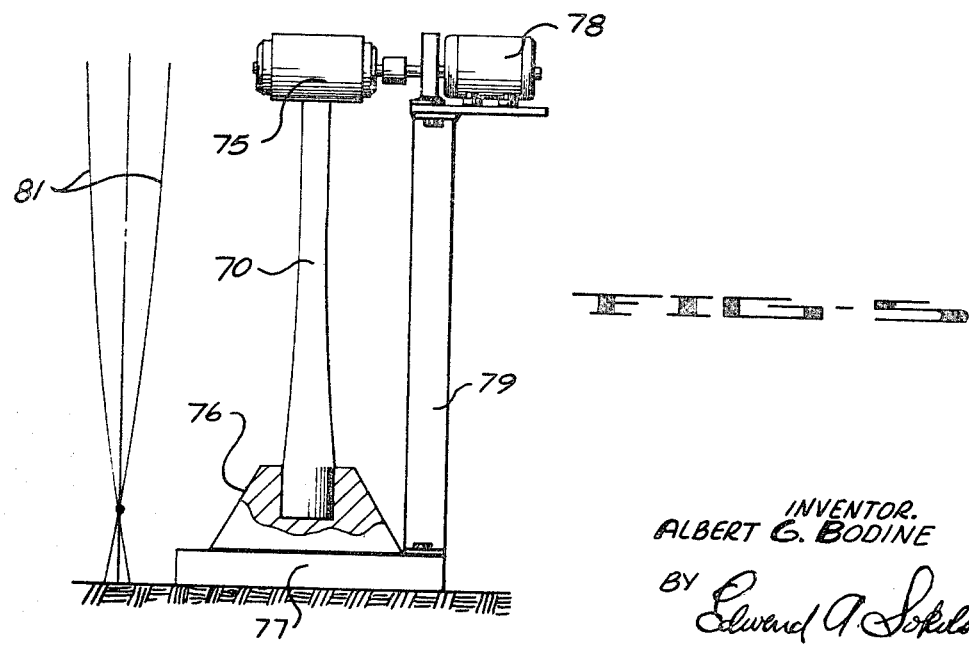

Other objects of this invention will become apparent from the following description taken in connection with the accompanying drawings, of which:

FIG. 1 is a side elevation view of a first embodiment of the device of the invention, FIG. 2 is a view taken along the plane indicated by 2—2 in FIG. 1, FIG. 3 is a side elevation view illustrating the utilization of the embodiment of FIG. 1 for delivering sonic energy to the ground at some distance below the surface thereof, FIG. 4 is a cross-sectional view of an oscillator unit which may be utilized in the device of the invention, and FIG. 5 is an elevational view of a second embodiment of the device of the invention.

It has been found most helpful in analyzing the operation of the device of this invention to analogize the acoustically vibrating circuit involved to an equivalent electrical circuit. This sort of approach to analysis is well known to those skilled in the art and is described, for example, in Chapter 2 of Sonics, by Hueter and Bolt, published in 1955 by John Wiley and Sons. In making such an analogy, force F, is equated with electrical voltage E; velocity of vibration u, is equated with electrical current $i$; mechanical compliance $C_m$, is equated with electrical capacitance $C_e$; mass M is equated with electrical inductance L; mechanical resistance (friction) $R_m$, is equated with electrical resistance R; and mechanical impedance $Z_m$, is equated with electrical impedance $Z_e$.

Thus, it can be shown that if a member is elastically vibrated by means of an acoustical sinusoidal force $F_0 \sin \omega t$, ($\omega$ being equal $2\pi$ times the frequency of vibration), that $$Z_m = R_m + j\left(\omega M - \frac{1}{\omega C_m}\right) = \frac{F_0 \sin \omega t}{u} \quad (1)$$

Where $\omega M$ is equal to $1/\omega C_m$, a resonant condition exists, and the effective mechanical impedance, $Z_m$, is equal to the mechanical resistance, $R_m$, the reactive impedance components $\omega M$ and $1/\omega C_m$ cancelling each other out. Under such a resonant condition, velocity of vibration $u$, is at a maximum, power factor is unity, and energy is most efficiently delivered to a load to which the resonant system may be coupled.

Just as in electrical circuitry, maximum acoustical energy can be transferred from one circuit element to another where a good impedance match exists, i.e., where the two elements have like impedance. This fact becomes particularly significant in the instant invention where efficient energy transfer from the sonic generator to the earth is desirable to assure an optimum signal for the seismic analysis. By observation of Equation 1 it can be seen that the impedance $Z_m$, is high where the force $F_o$, is high, and velocity of vibration, $u$, is relatively low. Thus, is view of the high impedance characteristics of earthen formations, it is desirable that the earth connected end of the sonic vibration system exhibit high impedance characteristics, i.e., that high force low velocity conditions exist at this point.

Also of particular significance in the instant invention is the attainment of high acoustical Q in the resonant vibration system to markedly increase the efficiency of the vibration thereof and to provide a maximum amount of cyclic energy for the survey operations. As for the equivalent electrical circuit, the Q of an acoustically vibrating circuit is defined as the sharpness of resonance thereof and is indicative of the ratio of the energy stored in each vibration cycle to the energy used in each cycle. Q is mathematically equated to the ratio between $\omega M$ and $R_m$. Thus, the effective Q of the acoustically vibrating circuit can be maximized to make for highly efficient high aplitude vibration by minimizing the effective friction in the vibrating circuit, and/or maximizing the effective mass in such circuit.

In considering Equation 1 it should be kept in mind that this equation represents the total effective resistance, mass, and compliance, in the acoustically vibrating circuit, and that these parameters are generally distributed throughout the system rather than being lumped in any one component or portion thereof.

It is to be noted that orbiting mass oscillators are utilized in the devices of the invention that automatically adjust their output frequency and phase to maintain resonance with changes in the characteristics of the load. Thus, in the face of changes in the effective mass and compliance presented by the load with changes in the conditions of the surrounding earthen material as it is sonically excited, the system automatically is maintained in optimum resonant operation by virtue of the "lock-in" characteristics of applicant's unique orbiting mass oscillators. The vibrational output of such orbiting mass oscillators may be generated along a controlled predetermined coherent path to provide maximum output along a desired axis. The orbiting mass oscillator automatically changes not only its frequency but also its phase angle and therefore its power factor with changes in the resistive impedance load to assure optimum efficiency of operation at all times.

Referring now to FIGS. 1 and 2, a first embodiment of the device of the invention is illustrated. Base member 11, which has a high mass and may be fabricated of a material such as concrete or a suitable metal, rests on the ground 12. Supported on base member 11 by means of posts 13 is circular plate member 15. Plate member 15 and posts 13 are preferably fabricated of an elastic metal such as steel. Located on plate member 15 by means of metallic spacer 16 is flexible diaphragm member 17. A similar flexible diaphragm member 18 is supported on base member 11 by means of metallic spacer 19. Spacer members 16 and 19 are preferably fabricated of elastic metal such as steel. Diaphragm 17 is joined at the edge thereof to a similar diaphragm 21 and diaphragm 18 similarly is joined to diaphragm 22 by means of rods 25 and nuts 27 which threadably engage the ends of the rods. Spacer rings 32 are provided to separate the edges of the diaphragms and to permit pneumatic communication to the inside thereof from pneumatic line 40. Diaphragms 21 and 22 are connected to oscillator housing 35 by means of metallic flanges 37 and 38 respectively. The diaphragms thus form a pair of circular expansible bladders 29 and 30, one side of each of which is connected to oscillator housing 35, the other side of each of such bladders being coupled to base member 11.

Oscillator housing 35 has a pair of races 35a and 35b formed therein in which are contained rotor members 41 and 42 respectively. Rotor members 41 and 42 are driven in opposite directions by means of a motor (not shown) which is coupled thereto through shaft 44 and gear train 45. Rotors 41 and 42 are phased with respect to each other (as indicated in FIG. 1) such that transverse vibrational components effectively cancel each other out, while the longitudinal vibrational outputs are additive, this resulting in high level vibrational outputs in the directions indicated by arrows 50. The frequency of such vibrational output is determined by the speed of rotation of rotors 41 and 42.

Bladders 29 and 30 are pneumatically loaded by means of pressurized air fed thereto from pneumatic tank 54 through lines 40. These pneumatic bladders form effective air springs, the compliance of which can be varied by changing the pressurization thereof. This end result may be achieved by means of needle valves 52 and outside bleed valves 53 which control the inflation and deflation respectively of flexible air bladders 29 and 30.

In the design of the vibration system, including base member 11, air bladder members 29 and 30 and the interconnecting components, the resonant vibration frequency thereof is generally made higher than the natural vibration frequency of either the ground or the base member for optimum results. At any particular transmission frequency, the pressurization of the bladder implemented air springs is adjusted by means of valves 52 and 53 until optimum coupling of sonic energy to the ground is evidenced, the adjustment of the pressurization of the diaphragms changing the effective impedance of such elements to obtain optimum coupling between the sonic oscillator and the base member and between the base member and the ground. Such optimum coupling of energy to the ground is readily ascertained by the presence of a corresponding maximum signal in the seismic signal receiver and indicator device.

It should be noted that once bladders 29 and 30 have been pneumatically loaded, needle valves 52 should be closed to prevent pneumatic communication between the two bladders which might cause undesirable interaction therebetween.

Referring now to FIG. 3, the utilization of the first embodiment of the device of the invention in conjunction with a casing member for transmitting the sonic energy output to a point some distance below the surface is illustrated. Here the base 11 is tightly coupled to casing member 55 which has been driven some distance into the ground 12. Casing member 55, which is preferably fabricated of an elastic material such as steel, efficiently couples the sonic energy to the ground some distance below the surface thereof (of the order of 50–100 feet). Such below surface coupling is often desirable in seismic survey work to avoid the effects of interfering surface transmitted signals and surface damping.

Referring now to FIG. 4, an oscillator unit which may be utilized in the device of the invention is illustrated. Rotor 60 is rotatably driven by rotor drive members 62 by virtue of the mating engagement of the teeth of gear rings 60a with the teeth of gear rings 62a. Rotor drive members 62 are rotatably driven on ball bearings 65 and 66 by means of drive shaft 64. Rotor 60 is thus rotatably driven around a race 67a formed in oscillator housing 67, such rotation being facilitated by virtue of the mating engagement of the gears of gear rings 60b and 67b. In this manner, rotor 60 is driven eccentrically about shaft 64 to provide the desired vibrational output.

Referring now to FIG. 5, a second embodiment of the device of the invention is illustrated. In this second embodiment, the acoustical transformation is achieved by means of an elastic bar member 70 which may be fabricated of an elastic metal such as steel, such bar member being press-fitted into a metallic pedestal member 76 which in turn is supported on high mass base member 77. Oscillator 75 is supported on the top of bar member 70 and firmly attached thereto, such oscillator being similar in configuration to that described in connection with FIG. 1, to generate a vibrational output along the longitudinal axis of bar member 70. Oscillator 75 is rotatably driven by motor 78, such motor being supported on stand 79 which in turn is supported on base 77.

The vibration system including bar member 70, pedestal 76 and base 77 is preferably designed so that resonant vibration thereof will occur at a frequency near the high end of the frequency band to be swept. A standing wave pattern such as indicated by graph lines 81 is set up in the vibrational system, which as can be seen effectively transforms the low impedance (high amplitude) output of oscillator 75 into a high impedance (high force, low amplitude) signal at high mass base member 77. This second embodiment, while quite effective in impedance matching the oscillator output to the load, of course, cannot be adjusted for each transmission frequency to provide optimum coupling for each such frequency as in the case of the first embodiment. It nevertheless provides a substantial improvement in the efficiency of energy transfer particularly noticeable at the higher transmission frequencies.

The apparatus of this invention thus provides highly effective means for efficiently coupling energy between a relatively low impedance output oscillator member and the ground which exhibits relatively high impedance characteristics, such coupling being effective over the entire range of a frequency band as might be swept in a seismic survey system. Means are further provided to adjust the coupling for optimum effect at various frequencies within the frequency band.

While the apparatus of this invention has been described and illustrated in detail, it is to be clearly understood that this is intended by way of illustration and example only and is not to be taken by way of limitation, the spirit and scope of this invention being limited only by the terms of the following claims.

I claim:
1. An acoustical transformer device for impedance matching the output of a sonic generator to the ground comprising:
    a high mass base member coupled directly to the ground, and
    a compliant member for impedance matching the output of the sonic generator to said high mass base member, said sonic generator comprising a relatively low mass, one end of said compliant member being attached to said base member, the other end of said compliant member being attached to said sonic generator, said base member and said compliant member forming a resonant vibrational circuit at a frequency substantially higher than the natural vibrational frequency of either said base member or the ground.
2. The device as recited in claim 1 wherein said compliant member comprises an air spring, said air spring comprising a pair of resilient diaphragms joined together to form an expansible bladder, one of said diaphragms being connected to said base member, the other of said diaphragms being connected to said sonic generator, and means for pneumatically pressurizing said bladder.
3. The device as recited in claim 2 and additionally comprising a second bladder similar to said first bladder connected between said sonic generator and said base member.
4. The device as recited in claim 2 wherein said means for pressurizing said bladder comprises a pneumatic source, means for selectively feeding air from said pneumatic source to said bladder and means for selectively bleeding air from said bladder.
5. The device as recited in claim 1 wherein said compliant member comprises a resilient bar member.
6. An acoustical transformer device for impedance matching the output of a sonic generator to the ground comprising:
    a high mass base member coupled directly to the ground, and
    an air spring member for impedance matching the output of the sonic generator to said high mass base member, one end of said air spring member being attached to said base member, the other end of said air spring member being attached to said sonic generator, said base member and said air spring member forming a resonant vibrational circuit at a frequency substantially higher than the natural vibrational frequency of either said base member or the ground.
7. The device as recited in claim 6 and additionally including means for selectively adjusting the air pressurization of said air spring member to change the effective compliance thereof.
8. The device as recited in claim 7 and additionally including a second air spring member similar to the aforementioned air spring member, one end of said second air spring member being attached to said base member, the other end of said second air spring member being attached to said sonic generator.

References Cited

UNITED STATES PATENTS

| | | | |
|---|---|---|---|
| 2,745,507 | 5/1956 | Bodine | 181—.5 |
| 2,960,314 | 11/1960 | Bodine | 181—.5 |
| 3,122,664 | 2/1964 | Loeb | 181—.5 |
| 3,280,938 | 10/1966 | Tullos | 181—.5 |
| 3,282,372 | 11/1966 | Brown et al. | 181—.5 |
| 3,296,589 | 1/1967 | Ikrath | 340—17 |

BENJAMIN A. BORCHELT, *Primary Examiner.*

W. KUJAWA, *Assistant Examiner.*